United States Patent Office 3,391,290
Patented July 2, 1968

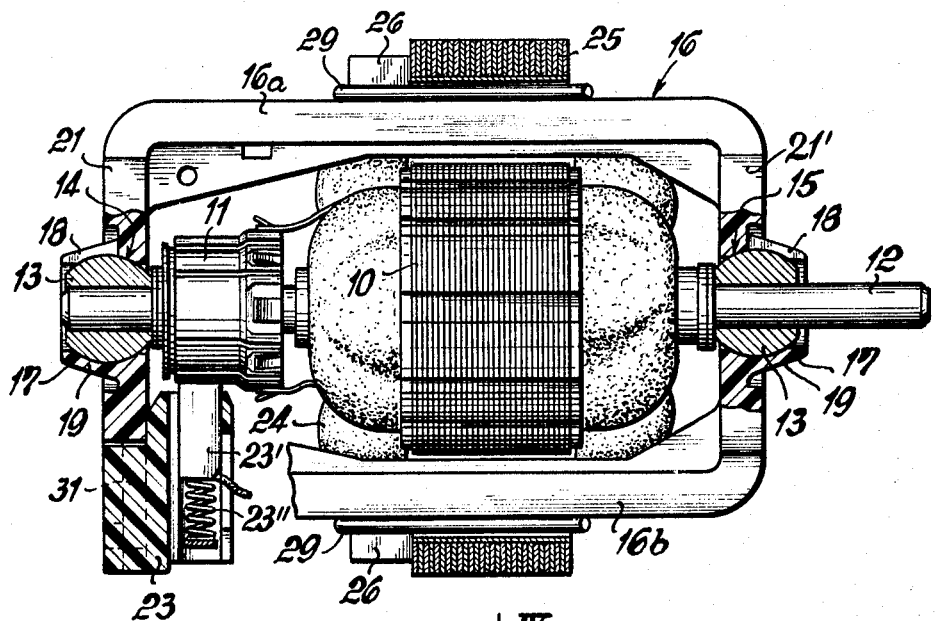
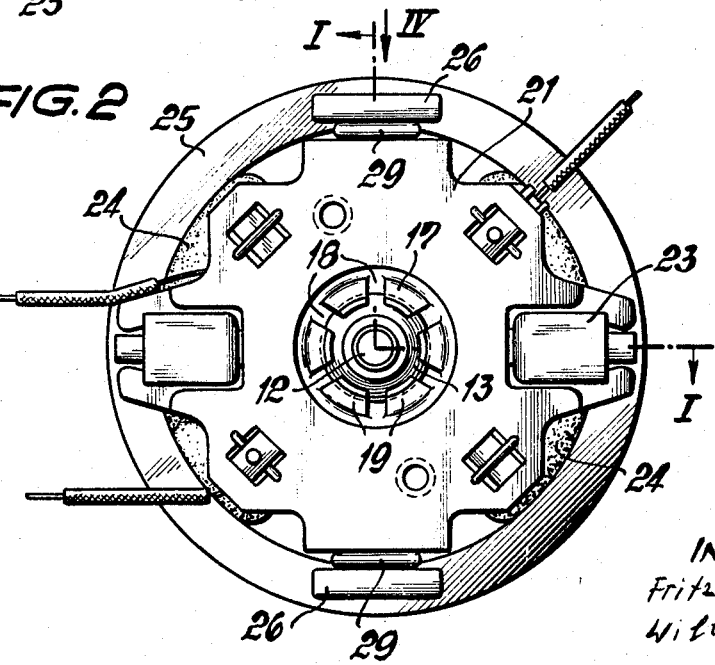

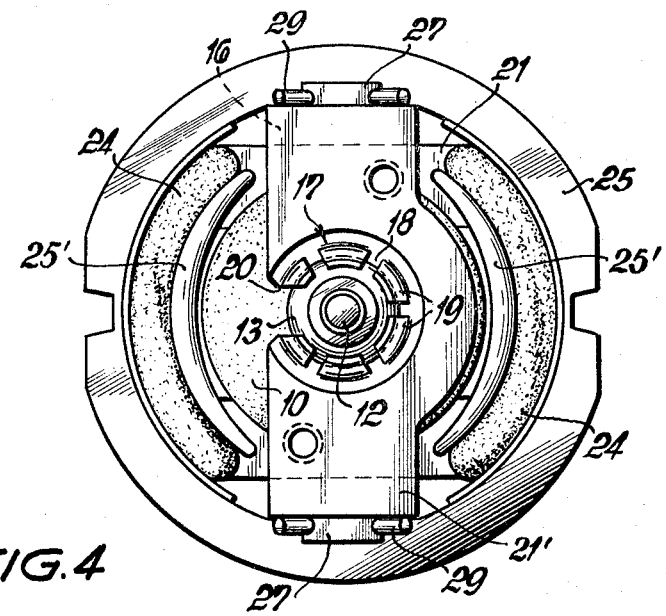
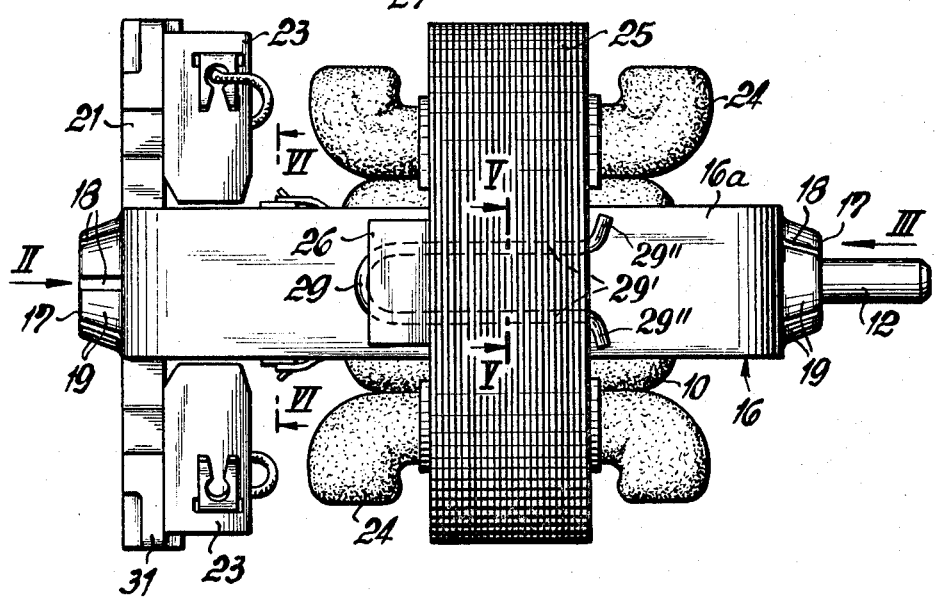
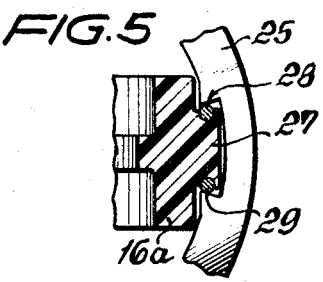

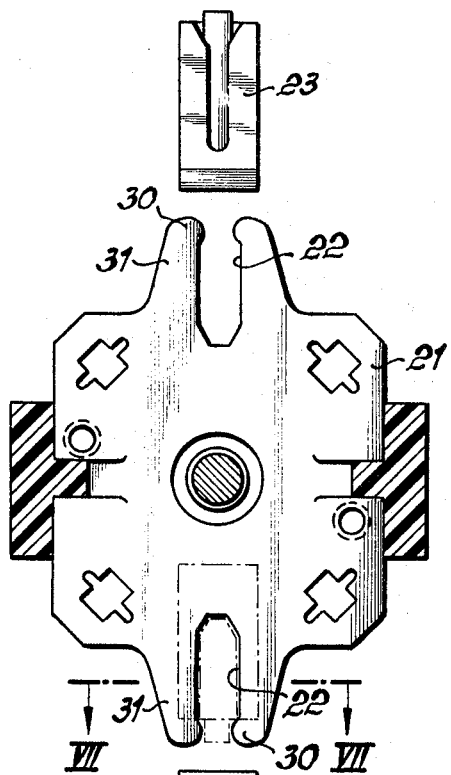
FIG. 6
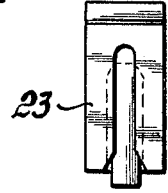
FIG. 7

3,391,290
ELECTRICAL FRACTIONAL-HORSE-POWER
DYNAMOELECTRIC MACHINE
Fritz Hahndorf and Willi Blume, Buhlertal, Germany, assignors to Robert Bosch G.m.b.H., Stuttgart, Germany
Filed Oct. 6, 1965, Ser. No. 493,320
Claims priority, application Germany, Oct. 7, 1964,
B 59,248
12 Claims. (Cl. 310—42)

The present invention relates to an electrical fractional horse-power engine, especially to a fractional horse-power D.C. motor. More specifically, the present invention relates to an electrical fractional horse-power engine which includes an integral frame formed of plastic material and carrying the rotor as well as the stator of the electrical engine.

It is an object of the present invention to provide an electrical fractional horse-power engine having an integral frame of plastic material carrying the rotor as well as the stator of the engine and being constructed to facilitate the assembly of the various components of the engine.

It is an additional object of the present invention to provide an electrical fractional horse-power engine of the aforementioned kind which is composed of relatively few and simple parts so that the engine may be manufactured at reasonable cost and will stand up perfectly under extended use.

With these objects in view, the electrical fractional horse-power engine according to the present engine mainly comprises an integral frame of plastic material having a pair of spaced opposite end wall portions integrally connected to each other and being formed in each of said end wall portions with a resilient bearing receiving means, rotor means, a shaft carrying the rotor means for rotation about its axis and having a pair of opposite end portions, bearing means on the opposite end portions of the shaft for supporting the latter for rotation about said axis, which bearing means are received and carried in the aforementioned resilient bearing receiving means of the end wall portions of the frame, and stator means carried by the frame about the rotor means.

Preferably, each of the end wall portions of the frame is formed with an opening therethrough aligned along a common axis with each other, and with an annular projection about each opening, each of which is formed with a plurality of angularly displaced substantially radially extending slots dividing each of the annular projections into a plurality of resilient tongues, thus forming about each of the openings the aforementioned resilient bearing receiving means, whereby the bearing means on the opposite end portions of the shaft when pushed into the resilient bearing receiving means on the end wall portions of the frame will spread the tongues forming the resilient bearing receiving means apart, and the tongues will subsequently thereto snap back and resiliently abut against the bearing means to securely hold the latter in place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partially sectioned side view of the electromotor according to the present invention, the section being taken along the line I—I of FIG. 2 and viewed in the direction of the arrows;

FIG. 2 is an end view of the electromotor shown in FIG. 1 and viewed in the direction of the arrow II of FIG. 4;

FIG. 3 is an end view of the motor shown in FIG. 1 viewed in the direction of the arrow III in FIG. 4;

FIG. 4 is a top view of the motor viewed in the direction of the arrow IV of FIG. 2;

FIG. 5 is a partial sectional view taken along the line V—V of FIG. 4;

FIG. 6 is a sectional view taken along the line VI—VI of FIG. 4 and this view also showing a pair of brush holder means in removed position; and FIG. 7 is a partial cross sectional view taken along the line VII—VII of FIG. 6 and showing the brush holder means in inserted position.

Referring now to the drawings, and more specifically to FIG. 1 of the same, it will be seen that the electrical fractional horse-power engine according to the present invention mainly comprises an integral frame 16 of plastic material having a pair of spaced opposite and substantially parallel end wall portions 21 and 21′ integrally connected to each other by connecting portions 16a and 16b extending substantially parallel to each other between opposite ends of the end wall portions 21 and 21′. The end wall portion 21 is formed with an opening 14 therethrough and the end wall portion 21′ is formed with a corresponding opening 15 therethrough aligned along a common axis with the opening 14. The end wall portions 21 and 21′ are also each formed with an annular, outwardly extending projection 17 extending about the respective opening and each formed with a plurality of angularly displaced substantially radially extending slots 18 dividing each of the annular projections 17 into a plurality of resilient tongues 19 forming about each of the aforementioned openings resilient bearing receiving means. The fractional horse-power motor includes further rotor means 10 which together with a commutator 11 of known construction are fixedly mounted on a shaft 12 having a pair of opposite end portions respectively rotatably received in a pair of metallic bearing means 13. Each of the bearing means 13 are partly received in the openings 14 and 15, respectively, whereas the outer portions of the bearing means 13 are received between the resilient tongues 19, the inner surfaces of which conform to the spherical outer surface of the bearing means 13. The tongues 19 are constructed in such a manner that the spherical bearing means 13 may be pushed from the outside of the end wall portions 21 and 21′ inwardly, whereby the tongues 19 will be resiliently spread in radial direction and then snap back again to press the spherical bearing means 13 against corresponding spherical portions at the outer ends of the openings 14 and 15 so as to properly hold the bearing means 13 in place.

The end wall portion 21′ of the frame 16 is also formed with a transverse slot 20 (FIG. 3) which extends from one side face of the end wall portion 21′ into the latter up to the opening 15 formed in the end wall portion 21′. The slot 20 has a width which is smaller than the diameter of the spherical bearing means 13, but at least equal and preferably slightly larger than the diameter of the end portion of the shaft 12 extending through the bearing means 13 partly received in the opening 15.

The end wall portion 21 facing the commutator 11 is preferably plate shaped and provided with two pairs of elongated portions 31 (FIG. 6) projecting laterally and respectively to opposite sides of the plate shaped end wall portion 21 and each pair being separated by a slot 22 extending in substantially radial direction toward but short of the opening 14. Brush holder means 23, of a cross section as best shown in FIG. 7, are respectively received in the slots 22 and inwardly extending projections 30 at the outer ends of the elongated portions securely hold the brush holder means 23 in place after the same have been inserted in the slots 22 in the position as shown in dash-dotted lines at the lower portion of FIG. 6.

Each of the brush holder means 23 houses a brush 23' resiliently pressed by a coil spring 23" against the commutator 11.

The laminated stator of the electromotor comprises a substantially annular portion 25 extending about and being carried by the connecting portions 16a and 16b of the frame 16 and a pair of opposite pole shoe portions 25' projecting from the inner surface of the annular portion toward the rotor means 10 and carrying the field winding 24. Each of the connecting portions 16a and 16b of the frame 16 is provided intermediate its ends with an outwardly extending projection 26 and the annular portion 25 of the stator means abuts with one side face thereof against corresponding faces of the projections 26. The annular portion of the stator means is formed with a pair of diametrically opposite substantially dovetailed grooves 28 and the connecting portions 16a and 16b are formed in the region of the annular portion 25 of the stator means with corresponding ribs 27 respectively received in the dovetailed grooves 28.

The arrangement includes further means for releasably securing the stator means 25 to the connecting portions 16a and 16b of the frame. These means include a pair of substantially U-shaped wire members 29 having each a pair of leg portions 29' integrally connected at one end thereof to each other. The U-shaped wire members 29 respectively extend with the connected ends thereof about the projections 26, whereas the leg portions 29' thereof respectively extend between opposite side faces of the dovetailed grooves 28 and the dovetailed ribs 27 and each having free end portions 29" extending transverse to the remainder of the respective leg portion and abutting against the side face of the annular portion 25 of the stator means facing away from the projections 26.

The various components of the above described electrical fractional horsepower motor above described are assembled with each other in the following manner:

The rotor means 10 and the commutator 11 are fixedly mounted in a known manner on the shaft 12 in such a manner that opposite end portions of the shaft 12 project beyond the commutator 11 and the rotor means 10 in the manner as best shown in FIG. 1. Then the short or left end portion, as viewed in FIG. 1, of the shaft 12 projecting beyond the commutator 11 is inserted as far as possible in the opening 14 in the end wall portion 21 of the frame 16. Afterwards the longer end portion, that is the right end portion of the shaft 12 as viewed in FIG. 1, is swung through the slot 20 in the end wall portion 21' of the frame 16 into the opening 15. Subsequently thereto, the spherical bearing means 13 are respectively pushed from the outside onto the opposite end portions of the shaft 12, whereby the resilient tongues 19 are spread in radial direction and, after the spherical bearing means are pushed against the spherical portions of the opening 14 and 15, the resilient tonges 19 will snap back to hold the spherical bearing means 13 securely in place so that the latter are secured against displacement in axial direction. The annular portion 25 of the stator means is then pushed from the right side, as viewed in FIG. 1, over the connecting portions 16a and 16b of the frame 16 until the left end face, as viewed in FIG. 1, thereof abuts against the corresponding end face of the projections 26. The annular portion 25 is thereby oriented in such a manner that the ribs 27 on the connecting portions 16a and 16b will be located in the grooves 28. The leg portions 29' of the U-shaped wire members 29 are then pushed from the left side, as viewed in FIG. 1 between the corresponding side faces of the dovetailed grooves 28 and the corresponding dovetailed ribs 27 with the connected ends of the leg portions 29 encompassing respectively the projections 26, until the free end portions 29" project beyond the right end face of the annular portion 25 of the stator means, as viewed in FIG. 4. The free end portions 29" are then bent in a direction transverse to the remainder of the leg portions 29' to thus securely hold the annular portion 25 of the stator means in place on the connecting portions of the frame 16 abutting against the projections 26. Finally, the brush holders 23 are pushed into the slots 22 of the plate shaped end wall portion 21 of the frame 16, whereby the elongated portions 31 defining the slots 22 will resiliently yield laterally during pushing of the brush holders 23 into the slots 22 to snap back after the brush holders are pushed home to their end positions, whereafter the projections 30 at the free ends of the elongated portions 31 will hold the brush holders 23 in proper place.

It will be understood that each of the elements described above, or two or more together, may also find a useful application in other types of electrical fractional horsepower engines differing from the types described above.

While the invention has been illustrated and described as embodied in an electrical fractional horsepower engine having a one-piece frame of plastic material and carrying the rotor and stator of the engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electrical fractional-horse-power dynamoelectric machine comprising, in combination, an integral frame of plastic material having a pair of spaced opposite end wall portions integrally connected to each other and being formed in each of said end wall portions with a resilient bearing receiving means; rotor means; a shaft carrying said rotor means for rotation about its axis and having a pair of opposite end portions; bearing means on said opposite end portions of said shaft for supporting the latter for rotation about said axis, said bearing means being received and carried in said resilient bearing receiving means of said end wall portions of said frame; and stator means carried by said frame about said rotor means.

2. An electrical fractional-horse-power dynamoelectric machine as set forth in claim 1 and including securing means for releasably securing said stator means to said frame.

3. An electrical fractional-horse-power dynamoelectric machine, especially a fractional-horse-power D.C. motor, comprising, in combination, an integral frame of plastic material having a pair of spaced opposite end wall portions integrally connected by a pair of connecting portions respectively extending between opposite ends of said end wall portions, one of said end wall portions being plate-shaped and being formed with a pair of slots extending in substantially radial direction from opposite outer edge portions of said plate-shaped end wall portion toward each other, each of said end wall portions being formed with an opening therethrough aligned along a common axis with each other, and with an annular projection about each opening, each of which being formed with a plurality of angularly displaced substantially radially extending slots dividing each of said annular projections into a plurality of resilient tongues and forming about each of said openings resilient bearing receiving means; a pair of brush holder means respectively received in said pair of slots of said plate-shaped end wall portions of said frame; rotor means including a commutator facing said plate-shaped portion of said frame; a pair of brush means respectively carried by said pair of brush holder means and cooperating with said commutator; a shaft carrying said rotor means for rotation about its axis and having a pair of opposite end portions; bearing means on said opposite end portions of said shaft for supporting the latter for rotation about said axis, said bearing means being received and carried in said resilient bearing receiving means of said end wall portions of said frame; and stator means carried by said frame about said rotor means.

4. An electrical fractional-horse-power dynamoelectric machine as set forth in claim 3, wherein said plate-shaped end wall portion is provided with two pairs of elongated portions respectively projecting laterally to opposite sides of said plate-shaped end wall portion and each pair of said elongated portions defining one of said pair of slots therebetween and each of said projecting portions being formed at the outer end thereof with a projection extending into the respective slot for resiliently maintaining said brush holder means in said slots.

5. An electrical fractional-horse-power dynamoelectric machine comprising, in combination, an integral frame of plastic material having a pair of spaced opposite end wall portions integrally connected to each other, each of said end wall portions being formed with an opening therethrough aligned along a common axis with each other, and an annular projection about each opening and each being formed with a plurality of angularly displaced substantially radially extending slots dividing each of said annular projections into a plurality of resilient tongues and forming about each of said openings resilient bearing receiving means; rotor means; a shaft carrying said rotor means for rotation about its axis and having a pair of opposite end portions; bearing means on said opposite end portions of said shaft for supporting the latter for rotation about said axis, said bearing means being received and carried in said resilient bearing receiving means of said end wall portions of said frame; and stator means carried by said frame about said rotor means.

6. An electrical fractional-horse-power dynamoelectric machine as set forth in claim 5, wherein each of said bearing means is constituted by a substantially spherical member formed with a central bore therethrough.

7. An electrical fractional-horse-power dynamoelectric machine as set forth in claim 6, wherein one of said end wall portions is formed with a transverse slot extending from one side face of said one end wall portion into the latter and having a width at least equal to the diameter of said shaft, but smaller than the diameter of said spherical bearing member and permitting to swing one end portion of said shaft through said transverse slot during assembly of said rotor means and shaft with said frame.

8. An electrical fractional-horse-power dynamoelectric machine as set forth in claim 5, wherein said end wall portions are integrally connected to each other by a pair of connecting portions respectively extending between opposite ends of said end wall portions, and wherein said stator means includes an annular portion extending about and being carried by said connecting portions, and including means for releasably securing said stator means to said connecting portions of said frame.

9. An electrical fractional-horse-power dynamoelectric machine as set forth in claim 8, wherein each of said connecting portions has intermediate its ends an outwardly extending projection and said annular portion of said stator means abutting with one side face thereof against said projections.

10. An electrical fractional-horse-power dynamoelectric machine as set forth in claim 9, wherein said annular portion of said stator means is formed with a pair of diametrically opposite substantially dovetailed grooves and wherein said pair of connecting portions are each provided with a substantially dovetailed rib respectively received in said dovetailed grooves of said annular portion.

11. An electrical fractional-horse-power dynamoelectric machine as set forth in claim 10, wherein said means for releasably securing said stator means to said connecting portions of said frame include a pair of substantially U-shaped wire members having each a pair of leg portions integrally connected at one end thereof, said U-shaped wire members respectively extending with said connected ends thereof about said projections on said connecting members and said leg portion thereof respectively extend between opposite side faces of said dovetailed grooves and dovetailed ribs beyond the side face of said annular portion of said stator means which is opposite said one side face thereof and each having a free end portion extending transverse to the remainder of the respective leg portion and abutting against said opposite side face of said annular portion of said stator means.

12. An electrical fractional-horse-power dynamoelectric machine as set forth in claim 10, wherein said stator means includes a pair of opposite pole shoe portions projecting from said annular portion toward said rotor means and respectively located between said connecting portions of said frame and respectively displaced through an angle of substantially 90° relative thereto.

References Cited

UNITED STATES PATENTS

| | | | |
|---|---|---|---|
| 2,982,873 | 5/1961 | Simmons et al. | 310—42 |
| 3,002,794 | 10/1961 | Bluemink | 310—90 |
| 3,156,838 | 11/1964 | Winther | 310—42 |

MILTON O. HIRSHFIELD, *Primary Examiner.*

L. L. SMITH, *Assistant Examiner.*